United States Patent [19]
Guindy et al.

[11] Patent Number: 5,902,697
[45] Date of Patent: May 11, 1999

[54] BI-CELL SEPARATION FOR IMPROVED SAFETY

[75] Inventors: Wade Guindy; Tibor Kalnoki-Kis, both of Henderson, Nev.

[73] Assignee: Valence Technology, Inc., Henderson, Nev.

[21] Appl. No.: 09/079,971

[22] Filed: May 15, 1998

[51] Int. Cl.$^6$ ................................................. H01M 10/40
[52] U.S. Cl. .......................... 429/153; 429/306; 429/316
[58] Field of Search .................................... 429/192, 156, 429/159, 153, 316, 306

[56] References Cited

U.S. PATENT DOCUMENTS

5,173,376 12/1992 Page et al. .
5,288,565 2/1994 Gruenstern .
5,587,253 12/1996 Gozdz et al. .

*Primary Examiner*—John S. Maples
*Attorney, Agent, or Firm*—Young & Basile, P.C.

[57] ABSTRACT

Disclosed herein is a safety feature for batteries comprising an integrated series of lithium-ion bi-cells. Each individual bi-cell comprises, sequentially, an anode, a film separator, a cathode, a film separator, and an anode. When multiple bi-cells are joined within a single package an insulator element, preferably an electrolyte permeable insulator element, is placed between anode elements of adjoining bi-cells. This insulator element appears to restrict internal shorting during crushing of the battery, thus avoiding undesirable effects of shorting such as thermal run-away and producing a safer battery.

8 Claims, 3 Drawing Sheets

Figure 6b

BI-CELL SEPARATION FOR IMPROVED SAFETY

TECHNICAL FIELD

This invention relates generally to batteries comprising an integrated series of lithium ion bi-cells. Each individual bi-cell comprises, sequentially, an anode, a film separator, a cathode, a film separator, and an anode. More particularly, this invention relates to a safety device when multiple bi-cells are joined within a single package.

BACKGROUND OF THE INVENTION

A polymer electrolytic cell, such as a rechargeable lithium ion battery, is commonly constructed by means of the lamination of electrode and separator cell elements which are individually prepared. Each of the electrodes and the electrolyte film/separator is formed individually, for example by coating, extrusion, or otherwise, from compositions including binder materials and a plasticizer.

In the construction of a standard lithium-ion cell, for example, an anodic current collector may be positioned adjacent an anode (negative electrode) film, or sandwiched between two separate anode films, to form the negative electrode.

Similarly, a cathodic current collector may be positioned adjacent a cathode (positive electrode) film, or sandwiched between two separate cathode films, to form the positive electrode.

A separator is positioned between the negative electrode and the a positive electrode. The anode, separator, and cathode structures are then laminated to produce a unitary flexible electrolytic cell precursor structure.

An extraction process is used to prepare the cell precursor for activation with electrolyte. During processing of the cell precursor, a large quantity of a homogeneously distributed plasticizer is present in the solid polymeric matrix. Prior to activation of the electrolytic cell or battery, however, the organic solvent is removed. This is generally accomplished using an extracting solvent such as diethyl ether or hexane, or the application of a vacuum, which selectively extracts the plasticizer without significantly affecting the polymer matrix. This produces a "dry" electrolytic cell precursor, which does not include any electrolyte solvent or salt. An electrolyte solvent and electrolyte salt solution is imbibed into the "dry" electrolytic cell copolymer membrane structure to yield a functional electrolytic cell system.

A lithium ion battery typically comprises several solid, secondary electrolytic cells in which the current from each of the cells is accumulated by a conventional current collector, so that the total current generated by the battery is roughly the sum of the current generated from each of the individual electrolytic cells employed in the battery. In lithium ion batteries it is common to stack separate electrolyte cells to create the battery.

Figure 1:
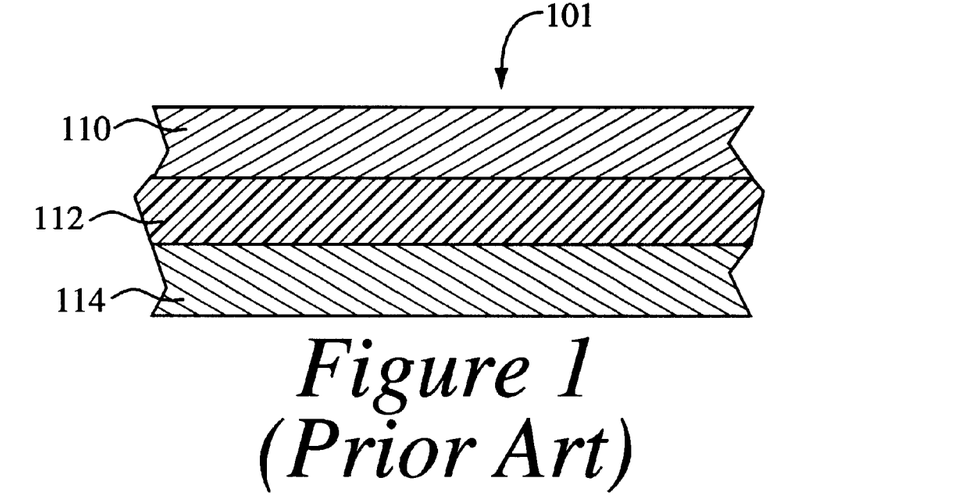
FIG. 1 shows a cross-sectional view of an electrolytic cell, including anode, cathode, and separator.
Figure 2:
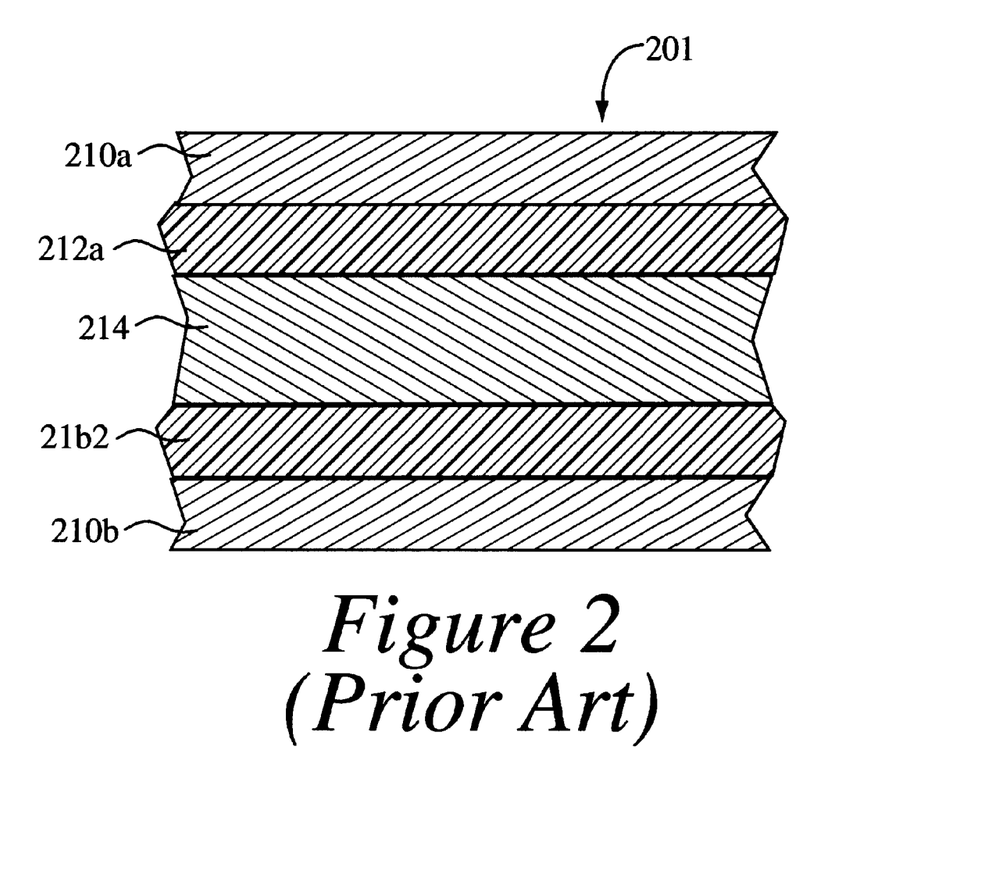
FIG. 2 shows a cross-sectional view of a cathode-out bi-cell, including first and second cathodes, first and second separators, and central anode.

Lithium ion electrolytic cells 101 may be of the traditional "sandwich" type, shown in FIG. 1, with a cathode 110, a separator 112, and an anode 114 sandwiched together. However, there is a trend to develop "bi-cells", in which two anodes or two cathodes are present, surrounding a single opposite electrode. A cathode-out bi-cell 201, such as that shown in FIG. 2, includes, sequentially, a first cathodic electrode 210a, a first separator 212a, a central anode 214, a second separator 212b, and a second cathodic electrode 210b. Electrode tabs connect the anode and cathode elements to the exterior of the package. Batteries constructed of cathode-out bi-cells tend to successfully pass abuse tests which are geared toward crushing, but do not pass abuse tests in which a nail is driven through the battery.

Figure 3:
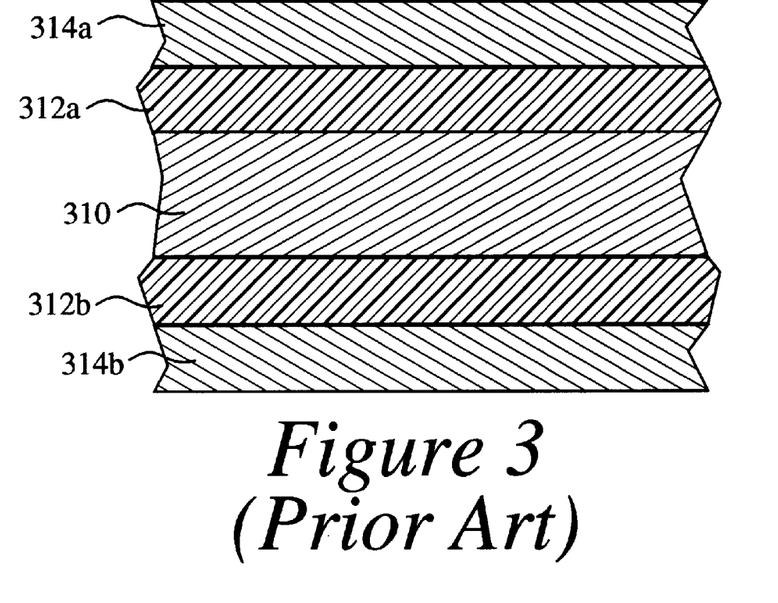
FIG. 3 shows a cross-sectional view of an anode-out bi-cell, including first and second anodes, first and second separators, and central cathode.

An anode-out bi-cell 301, for example that shown in FIG. 3, includes, sequentially, a first anodic electrode 314a, a first separator 312a, a central cathode 310, a second separator 312b, and a second anodic electrode 314b. Electrode tabs connect the anode and cathode elements to the exterior of the package.

Figure 4:
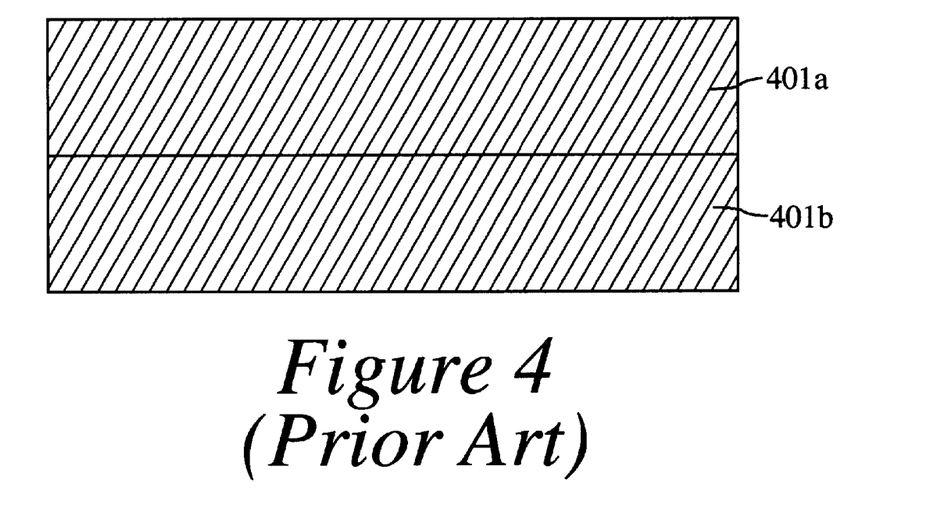
FIG. 4 shows a cross-sectional view of two stacked anode-out bi-cells.

Batteries constructed of anode-out bi-cells tend to successfully pass abuse tests in which a nail is driven through a battery, but commonly fail crush abuse tests. A battery consisting of two anode-out bi-cells 401a, 401b, is shown in FIG. 4. Batteries such as that shown in FIG. 4 commonly include two to six anode-out bi-cells, and may include more bi-cells.

One approach to limiting the failure of bi-cell batteries during abuse testing has been the limitation of the total battery capacity, which limits the possibility of adverse affects during abuse testing.

A parallel approach to limiting the failure effects of bi-cell batteries has been a limitation on the use of high surface area graphite within the electrodes. The use of such graphite has been limited in the prior art due to the undesirable reactivity of batteries under conditions of abuse. The industry response has been to forgo the use of high surface area graphite and the increased potential it provides in order to provide safer batteries.

In view of the above shortcomings associated with the prior art, there is a need for solid state electrochemical devices that are safer than those previously disclosed, and which can safely provide batteries having higher energy density and increased potential than previously available.

SUMMARY OF THE INVENTION

The invention herein provides for a safe, energy efficient method of providing two or more stacked anode-out bi-cell structures. An insulator member is placed between adjacent anode-out bi-cells. The insulator member provides electrical separation of adjacent anodes during abuse conditions. An effective insulator member eliminates the internal shorting which is present during crush abuse testing of the anode-out bi-cell batteries of the prior art.

The insulator member can be any insulative material which is compatible with the anode material and the electrolyte used, and which is not degraded during battery storage or use. Polyester, nylon or mylar films, for example, are appropriate. Preferably, the insulator member is produced from a separator membrane such as that known in the art. More preferably, the insulator member is a separator membrane such as that used as the separator of the bi-cell.

BRIEF DESCRIPTION OF THE DRAWINGS

The Figures are drawn for clarity and are not drawn to scale. Similar numbers refer to similar structures.

DETAILED DESCRIPTION OF THE INVENTION

A traditional lithium ion electrochemical cell has a negative electrode, a positive electrode, and a separator (generally a polymeric electrolyte film) therebetween. An ion-conducting electrolyte provides ion transfer from one electrode to the other, and commonly permeates the porous structure of each of the electrodes and the separator.

Bi-cells include a central electrode (either cathode or anode), with the opposing electrode present on each side of the central electrode, separated by membrane or separator layers.

Cathode-out bi-cells (such as that depicted in FIG. 2) tend to perform well on crush tests, but do not do well on abuse penetration testing. In contrast, anode-out bi-cells of the prior art (such as that depicted in FIG. 3) generally show adequate performance on penetration testing, but fail abuse crushing tests. Typical battery failure mode includes battery failure and the generation of heat, smoke, and sparks.

The improved anode-out bi-cells of the subject invention provide excellent results under conditions of both crushing abuse and penetration abuse.

The anode-out bi-cells of the subject invention include at least two anode-out bi-cells. Each bi-cell includes a first anode, a first separator element, a central cathode, a second separator element, and a second anode. An insulator element is present between each anode-out bi-cell in the stack.

Additional insulator elements may be present on one or more outer surfaces of the multiple bi-cell structure. It has been unexpectedly discovered that the presence of an insulator structure at the surface of a bi-cell which is being manufactured with pick-and-place equipment can assist in the processing of the bi-cells.

It has also been unexpectedly discovered that the presence of an insulator member between stacked anode-out bi-cells improves the manufacturing parameters of the battery system, and provides a more stable stacked structure than is provided without the insulator.

In the construction of a lithium ion anode-out bi-cell battery such as that shown in cross section in FIG. 4, a binder material provides a polymeric matrix for each of the anodes, the separator membranes, and the cathode.

Polyvinylidene difluoride (PVdF) and hexafluoropropylene (HFP) copolymers are common binder materials, and are the binder materials which are generally useful in the subject invention. The copolymer generally comprises about 75 to 92% (by weight) of the PVdF, and about 8 to 25% HFP. Preferably, the copolymer comprises about 85 to 90% of the PVdF, and about 10 to 15% HFP. One especially preferred, commercially available copolymer material is KYNAR™ Flex 2801 (Elf Atochem North America, Philadelphia, Pa.), which provides an 88:12 ratio of PVdF:HFP. Inorganic filler adjuncts, such as fumed alumina or fumed silica, are added as desired to provide structural stability to the binder and provide a film having desirable qualities.

A separator membrane may be a commercially available separator made of glass fiber, porous polypropylene or porous polyethylene. Such separators include Type A/E glass fiber filters (Gelman Sciences, Ann Arbor, Mich.), and Celgard (Hoechst-Celanese Corp., N.Y., N.Y.). However, the separator is preferably a solid polymeric matrix, such as the polymeric membrane described above. Such separator membranes are known to the art. Preferred polymeric electrolyte membranes are produced using a casting process in which a carrier liquid is removed to form a flexible sheet. An alternate preferred method produces polymeric electrolyte membranes by extrusion processes. Suitable polymeric electrolyte membranes provide a porous structure, permeated with a plasticizer, upon casting or curing.

A plasticizer is an organic solvent that facilitates the formation of porous polymeric structures. Appropriate plasticizers have high boiling points, typically in the range from about 150° to about 350° C. The plasticizer or plasticizer system must be compatible with the components of the electrochemical cell precursor, it must be processable within design parameters, and it must exhibit low polymer solubility. The plasticizer may be subsequently removed (for example, by extraction) prior to the formation of the activated electrolytic cell.

A variety of plasticizers for processing or activation of the battery precursor are known to the art. Such materials include, for example, ethylene carbonate (EC); propylene carbonate (PC); butylene carbonate (BC); vinlyene carbonate (VC); dimethyl adipate (DMA); diethyl carbonate (DEC); dipropylene carbonate (DPC); dibutyl carbonate (DBC); acetates; diesters; oxalates such as dimethyl, succinate, adipate, suberate, and sebacate oxalates; glymes; and low molecular weight polymers such as polycarbonates, polyacrylates, polyesters or polysiloxanes. Other plasticizers include dimethyl, diethyl, dipropyl, dibutyl, and dioctyl adipate. Mixtures of such plasticizers can also be used.

Each of the anodic and cathodic electrodes are formed by similar processes, but include specific anode-active or cathode-active materials in the polymeric binder. That is, a solid polymeric matrix provides part of the structure of the electrode. The polymeric matrix is formed using solid-polymer-forming material such as described above.

An electrode film forming material includes a binder, appropriate electrode active (anode-active or cathode-active) materials, a plasticizing solvent and, if appropriate, a casting solvent. Upon removal of casting solvent from the electrode film forming material, an electrode film is formed. Suitable electrode films provide a flexible sheet having a porous electrode-active structure, permeated with a plasticizer, after solvent casting.

The negative electrode is the anode during discharge. Typical anode active materials are well known in the art, and include, by way of example, intercalation based anodes such as those using carbon or tungsten oxides, and the like. Anode active materials which are appropriate for use within the subject method include lithium intercalation anodes employing carbon materials such as graphite, cokes, mesocarbons, and the like. The anode may also include an electron conducting material such as carbon black.

The anode commonly includes a current collector laminated with the negative electrode material. Materials suitable for anodic current collectors are known to the art, and are usually comprised of an electron conductive material such as metals or alloys. Typical materials include nickel, iron, stainless steel, or copper. Preferably a copper foil sheet, open mesh, expanded metal, woven or non-woven or knitted wire fabric or grid is used. Each current collector is also connected to a current collector tab which extends from the edge of the current collector. In batteries comprising multiple electrochemical cells, the anode tabs are preferably electrically connected together (such as by welding) and connected to a nickel or copper lead. External loads can be electrically connected to the leads. Current collectors and tabs are described in U.S. Pat. Nos. 4,925,752; 5,011,501; and 5,326,653; each of which is incorporated herein. An adhesion promoter can be used to facilitate bonding between the anode material and the anodic current collector.

The positive electrode is the cathode during discharge. Many cathode active materials are known to the art, and include insertion compounds, i.e., any material which functions as a positive pole in a solid electrolytic cell. For lithium ion applications, these are normally characterized as containing all the lithium for the cell. Preferable cathodic materials de-intercalate lithium at a high voltage when contrasted to lithium, making them stable in air. Typical cathodic materials include, by way of example, transition metal oxides, sulfides, and selenides. Such materials include oxides of cobalt, manganese, and vanadium; sulfides of titanium, molybdenum, and niobium; the various chromium oxides; copper oxides; and lithiated oxides of cobalt, manganese and nickel; and the like. Cathodic materials include $Li_xMn_2O_4$, $LiCoO_2$, $LiNiO_2$, $LiCO_{0.5}Ni_{0.5}O_2$, and the like.

In a preferred embodiment, the cathodic material is mixed with an electroconductive material such as graphite, powdered carbon, powdered nickel, metal particles, conductive polymers, and the like. The cathode is preferably produced using a polymeric binder to form the positive cathodic film, i.e., a solid polymeric matrix provides part of the structure of the cathode. As with the polymeric electrolyte film/separator, the polymeric binder is formed using both a solid-polymer-forming material and a plasticizer compound.

A cathode generally includes a current collector laminated with a positive electrode active film material. Materials suitable for cathodic current collectors are known to the art, and are typically comprised of an electron conductive material such as metals or alloys. The cathode current collector is typically of aluminum, stainless steel, and such foils having a protective conductive coating foil. Preferably the cathode current collector is an aluminum foil sheet, open mesh, expanded metal, woven or non-woven or knitted wire fabric or grid. Each current collector is also connected to a current collector tab which extends from the edge of the current collector. In batteries comprising multiple electrochemical cells, the cathode tabs are preferably welded together and connected to a lead. External loads can be electrically connected to the leads. An adhesion promoter can be used to facilitate bonding between the cathode material and the cathodic current collector.

A "dry" electrolytic cell precursor is prepared by assembling an anode, a separator membrane, and a cathode, and extracting plasticizer from each of the layers. Although each of the electrodes and the separator can be individually extracted, it is generally more convenient to laminate or assemble the appropriate layers with the plasticizer intact, and extract the plasticizer from the battery precursor as a unit. Methods for battery precursor preparation and extraction are described in U.S. Pat. No. 5,456,000, which is incorporated herein by reference.

The extracted battery precursor is activated by the addition of a solvent/electrolytic salt solution. The electrolyte solvent is a solvent included in the electrolyte solution for the purpose of solubilizing alkali salts during operation of the electrolytic cell. The electrolyte solvent can be any compatible, relatively non-volatile, aprotic, relatively polar solvent. Preferably these materials have boiling points greater than about 85° C. to simplify manufacture and increase the operation range and shelf life of the battery. Typical examples of solvents are dimethyl carbonate (DMC), diethyl carbonate (DEC), propylene carbonate (PC), ethylene carbonate (EC), methyl ethyl carbonate (MEC), gamma-butyrolactone, triglyme, tetraglyme, dimethylsulfoside, dioxolane, sulfolane, and the like, and mixtures of such materials.

Electrolyte salts are those inorganic salts which are suitable for use in a non-aqueous electrolyte. Particularly useful are alkali salts wherein the cation of the salt is an alkali selected from the group consisting of lithium, sodium, potassium, rubidium, silver, and cesium, and which are suitable for use in the solvent-containing electrolyte and in the composite electrodes of an electrolyte cell.

A variety of electrolyte salts are known to the art. For example, $LiPF_6$, $LiSCN$, $LiAsF_6$, $LiClO_4$, $LiN(CF_3SO_2)_2$, $LiBF_4$, $LiCF_3SO_3$, $LiSbF_6$, $NaSCN$, and the like. The electrolyte salt typically comprises from about 5 to about 25 weight percent of the inorganic ion salt based on the total weight of the electrolyte. Preferably, the salt is present in the electrolyte solution from about 10 to 20 weight percent. The weight percent of the salt will vary with the type of salt and upon the specific electrolyte solvent employed, as known to the art.

The insulator layer, the innovation of the subject invention, is placed between adjacent anode-out bi-cells, and within a battery housing. It is in direct contact with the anode structure and the electrolyte which permeates the electrolytic cell structure of lithium ion batteries.

The insulator must be physically and electrochemically compatible with, and is preferably inert to, the anode and the electrolyte. That is, the insulator does not affect, and is not affected by, either the anode or the electrolyte.

Although the insulator is not in direct physical contact with the cathode or the separator, it is in electrochemical contact with each of these structures. It must also be electrochemically compatible with, and is preferably electrochemically inert to, the cathode and the separator.

The insulator material must not be degraded during storage of the battery, or by the shifting electrical and chemical balances encountered during battery charging and use.

The insulator member provides electrical separation of anodes of adjacent anode-out bi-cells during abuse conditions. To maintain this electrical separation, the insulator must be physically and chemically stable over the temperature range in which the battery functions.

The lower range of temperatures at which the battery is stored or used is commonly in the range of about −20 to about 65° C. At these temperatures the insulator material should show no cracking or degradation of function.

The upper range of temperatures encountered by batteries of the prior art are generally reached during abuse testing. For example batteries of the prior art can reach temperatures of 300° C. to 400° C. and above during abuse testing. Using the insulator of the subject invention, however, greatly reduces the shorting and runaway reactions which are common with the prior art. Batteries of the subject invention commonly reach only 50° C. or less, and preferably heat to only to 40° C. or less, during abuse testing such as that described herein. An insulator material which is stable to 200° C. is generally more than sufficient.

An effective insulator member eliminates the internal shorting which is present during crush abuse testing of the anode-out bi-cell batteries of the prior art. As such, the insulative properties of the insulator should not be destroyed under conditions of abuse. Materials which are rigid and fragile, which otherwise would be good electrochemical insulators, are not necessarily appropriate for use as the insulator member herein. For example, an insulator member made of a sheet of glass or silica would provide insulation during ideal conditions. Abuse of the battery, however, could cause the sheet of glass or silica to shatter, possibly destroying the insulative qualities necessary for safety.

The insulator member is thus preferably somewhat flexible, and can be punctured or severed without affecting the insulative characteristics of the material.

The insulator material may be permeable to the electrolyte solution, or it may be impermeable to the electrolyte solution. Appropriate materials which are impermeable to the electrolyte include films of mylar, nylon, polyester, and the like. Appropriate materials which are permeable to the electrolyte can include woven or perforated sheets of mylar, polyester, nylon, polypropylene, and the like. Other materials which are permeable to the electrolyte are porous or perforated due to their structure, such as commercially available glass fiber, porous polypropylene or porous polyethylene; or materials used as the separator in lithium ion batteries. Preferred insulators thus include glass fiber filters, and CELGARD™. However, the more preferred insulator is a solid polymeric matrix, such as the polymeric separator membranes described above.

Insulator members produced of a solid polymeric matrix material which is identical to the separator material has several advantages over alternate materials. Economies of scale are realized when a single material can be used for multiple functions. More importantly, perhaps, lamination of materials has proven to be problematic in lithium ion batteries. While lamination of the insulator structure to the anode is not required, it may facilitate construction of batteries using bi-cell units. The lamination of separator material to anode structures has been tested by the art, and methods for such lamination are currently known the art. The use of separator material as the insulator structure thus provides ease of integration into current production processes.

The insulator structure will vary in necessary thickness, depending upon the specific materials used in the laminar battery system. While it is a goal to minimize thickness of the battery as a whole, and of each element of the battery separately, the insulator structure must be sufficient to provide a margin of safety for the battery as a whole. Generally, the insulator structure will be in the range of about 3 $\mu$m to about 100 $\mu$m.

The margins of the insulator structure should approximate the perimeter of the anodes separated by the insulator. The insulator can be slightly larger than the anodes if it does not interfere with packaging. The insulator can be somewhat smaller than the anodes, but should not allow the anodes to directly contact each other even under abuse conditions.

Figure 5:
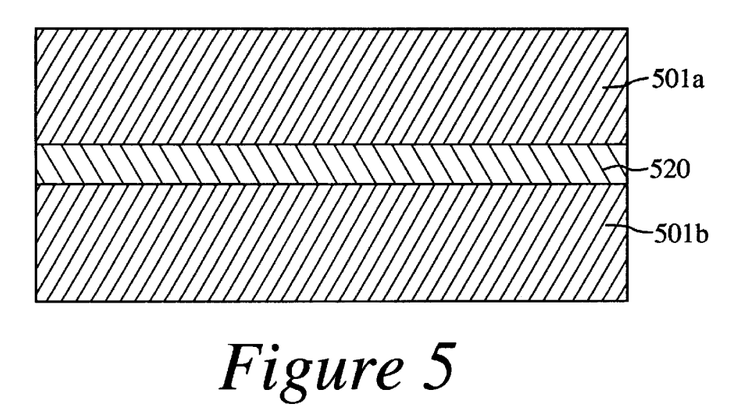
FIG. 5 shows a cross-sectional view of two stacked anode-out bi-cells of the subject invention, the two electrolytic cells being separated by an insulator membrane.
Figure 6A:
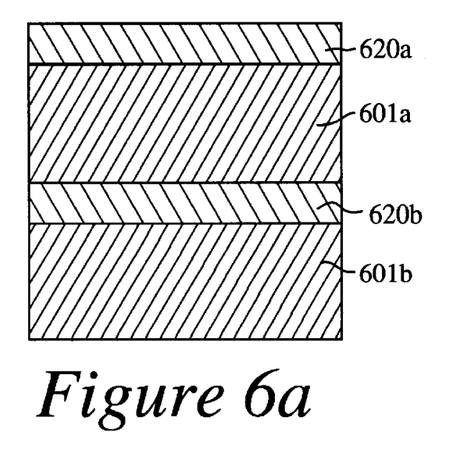
FIG. 6a shows a cross-sectional view of two stacked anode-out bi-cells of the subject invention. The two electrolytic cells are separated by an insulator membrane, and an insulator membrane is present on one of the outermost surfaces of one of the two anodic electrodes.

As shown in FIG. 5, a single separator structure 520 can be positioned between two anode-out bi-cells 501a, b. For ease of manufacture, however, it may be preferred to provide identical anode-out bi-cells having an insulator structure on a single outer surface. When these identical bi-cells are stacked, as shown in FIG. 6a, an insulator 620b is present between each set of bi-cells 601a, b, and an additional insulator structure 620a is present at one outer laminar surface.

Figure 6B:
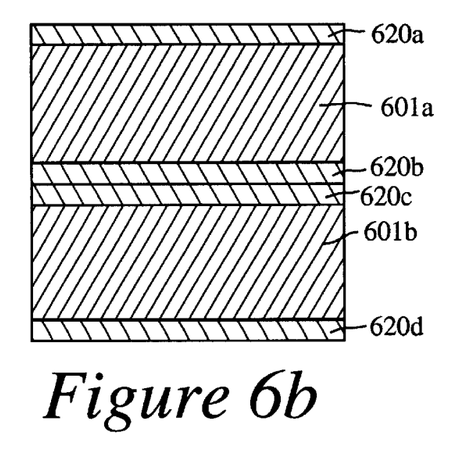
FIG. 6b shows a cross-sectional view of two stacked anode-out bi-cells of the subject invention. The two electrolytic cells are separated by an insulator membrane, and insulator membranes are present on each of the outermost surfaces of the anodic electrodes.

It may be preferred to provide each separate bi-cell with an insulator member on both outer surfaces of the bi-cell, as shown in FIG. 6b. Each inner insulator structure is comprised of two insulator members, one provided by each of the two bi-cells. For example, the bi-cell 601a includes two separator members, 620a and 620b. The bi-cell 601b includes two separator members, 620c and 620d. When the bi-cells 601a, b, are stacked, an internal insulator structure is formed from the two halves. This permits lamination of a thinner structure to each of the anode structures while providing a thicker structure where it is actually needed. It also permits mass production of identical bi-cells which can be stacked into a battery without regard to specific orientation.

It has also been discovered that the presence of an insulator structure made of a polymeric matrix PVdF:HFP material may provide unexpected benefits during preparation of battery assemblies. Specifically, the use of pick-and-place equipment has been problematic with the anode-out bi-cells of the prior art. However, the presence of a polymeric insulator laminated to the upper anode surface provides an improved surface for attachment of pick-and-place heads.

The laminated battery precursor is generally placed into a moisture-impermeable package, and electrically connected to electrode tabs, prior to activation by the electrolyte solution. Because many electrolyte salts are sensitive to moisture or other chemical compounds, the activation of the electrolytic cell precursor preferably takes place in an inert, moisture-free atmosphere, such as under an argon atmosphere or in a dry room.

The following examples are offered for purposes of demonstration, and not by way of limitation. In each of the batteries produced by the following examples a separator membrane is used as the insulator member. This is for convenience of comparison in the Experimental section, and is not a limitation of the materials which are suitable as the insulator.

EXAMPLE 1

Cathode Current Collector

An aluminum grid used for the anode current collector is a sheet of expanded aluminum metal of about 2.5 g/m$^2$. It is available under the designation 2A105-077 (flattened and annealed) (Delker, Branford, Conn.) or Exmet (Naugatuck, Conn.).

The surface of the aluminum grid is prepared by etching the grid in a series of solutions. Specifically, the aluminum grid is placed into an acetone bath for 5 minutes. It is then rinsed in water for 1 to 2 minutes. The aluminum grid is then dipped in an etch bath solution comprising 56 grams of potassium hydroxide pellets which have been dissolved in 1 L of methanol. The aluminum grid is removed from the etch solution after 8 minutes, and placed in a fresh water bath for 8 minutes, followed by an acetone bath for 3 minutes.

An adhesion promoter layer is prepared as a dispersed colloidal solution. A grid coating is formed by adding 100 parts (by weight) ethanol, 100 parts Morton Adcote 50C12, and 5 parts SUPER-PTM (M.M.M. Carbon, Willebrock, Belgium) into a ball mix jar, and mixed for one hour. The dispersed colloidal solution is diluted in 100 parts ethanol and spray coated onto the etched aluminum grid.

EXAMPLE 2

Cathode Structure

A polymer/cathode mixture is prepared by mixing 10 parts by weight of KYNAR™ Flex 2801 (a copolymer of PVdF and HFP) (Elf Atochem, Philadelphia, Pa.), 65 parts by weight 025C ($Li_xMn_2O_4$) (Kerr-McGee), and 5 parts of SUPER-PT carbon black. The material is mixed for 24 hours in a ball milling jar.

To the dry, powdery cathode active mix is added 20 parts of dibutyl phthalate (DBP). The wetted material is mixed under high shear for ten to thirty minutes, until a homogeneous mixture is formed. A blender maintained at a temperature of 130° C. is appropriate for the mixing.

Two cathode sheets, each having a thickness of 125 µm, are formed by hot pressing at 130° C. for 30 seconds on an appropriate substrate. A current collector of Example 1 is placed on the upper surface of the first cathode sheet. A second cathode sheet is then placed on the upper surface of the current collector. Pressure is applied to the resultant three-layer structure, to provide good contact between the layers, and the structure is hot-pressed at 130° C. for 20, 10 or 5 seconds to form a cathode structure. The final total thickness, including the cathode film and the aluminum grid, is approximately 60 to 500 µm.

EXAMPLE 3

Anode Current Collector

A copper grid used for the anode current collector is a sheet of expanded copper metal about 50 µm thick. It is available under the designation 2Cu5-155 (flattened and annealed) (Delker, Branford, Conn.).

The surface of the copper grid is prepared by etching the grid in a series of solutions. Specifically, the copper grid is placed into an acetone bath for 5 minutes. It is then rinsed in water for 1 to 2 minutes. The copper grid is then dipped in an etch bath solution comprising 1 molar nitric acid (70 ml 70% nitric acid and 1 L of water). The copper grid is removed from the etch solution after 5 minutes, and placed in a fresh water bath for 8 minutes, followed by an acetone bath for 3 minutes.

An adhesion promoter layer is prepared as described above, and spray coated onto the etched copper grid.

EXAMPLE 4

Anode Structure

A polymer mixture is prepared by placing 12 parts of PVdF:HFP copolymer (KYNAR™ Flex 2801) with 60 parts of BG34 (Superior Graphite, Bloomingdale, Ill.) into a ball mil jar and mixing for 24 hours. This produces a dry, powdery mix in which the particles are well-mixed and of small size.

To the dry, powdery mix is added 30 parts of dimethyl adipate (DMA). The wetted material is mixed under elevated temperature (130° C.) and high shear conditions for ten to thirty minutes or more, until a homogeneous mixture is formed.

An anode sheet is formed by hot pressing the anode material at 130° C. for 30 seconds on an appropriate substrate. A current collector of Example 3 is placed on the upper surface of the anode sheet, and pressure is applied to the resultant structure. To provide good contact between the layers, it is laminated at 120° C. with a hot roll laminator or hot press to form an anode structure. The final total thickness, including the anode film and the copper grid, is approximately 130 µm.

EXAMPLE 5

Separator 20 parts of treated fumed silica and 30 parts of KYNAR™ Flex 2801 are placed into a ball mill jar and mixed for 24 hours. This produces a dry, powdery mix in which the particles are well-mixed.

To the dry, powdery mix is added 55 parts of dibutyl phthalate (DBP). The wetted material is mixed under low shear for five to ten minutes, until a homogeneous mixture is formed.

The resultant mixture is hot-pressed at 130° C. for 30 seconds to form a strong, clear film having a thickness of about 1.25 mil.

EXAMPLE 6

Preparation of electrolytic Bi-Cell Precursor

A solid electrochemical cell precursor is formed by laminating a first anode of Example 4 adjacent a first polymeric separator film of Example 5, and laminating a second anode of Example 4 adjacent a second polymeric separator film of Example 5. A cathode of Example 2 is positioned between the two polymeric separator films of the two anode structures, and the unit is laminated together.

The layers are positioned as shown in FIG. 3. Sequentially, they are: the first anode 314a, a first separator 312a, the cathode 310, a second separator 312b, and the second anode 314b. The layers are heated under pressure to form a bi-cell precursor. The wt:wt ratio of cathode to anode in the completed bi-cell is 2.5:1.

EXAMPLE 7

Battery Precursor Preparation and Extraction Process

Six separate solid electrochemical precursor bi-cells of Example 6 are laminated together under moderate pressure and heat, and electrically connected. The battery precursor is immersed in a bath of methanol or diethyl ether or in a series of methanol or ether baths, to remove the plasticizer. Preferably, the methanol or ether bath(s) provide at least 30 minutes of contact with an excess of methanol or ether.

The extracted battery precursor is vacuum dried overnight at 40° C., and stored under dry box or anhydrous conditions until the cell is to be activated using an electrolyte solution.

EXAMPLE 8

Activation of Electrolytic Cell Precursor

An extracted battery precursor is prepared according to Example 7. An electrolyte solvent is prepared by combining 267 parts of ethylene carbonate and 133 parts of dimethyl carbonate. To the electrolyte solvent is added 60 parts of $LiPF_6$ to form an electrolyte solvent solution. The electrolyte solvent solution is added to the battery precursor of Example 7. The activated electrolytic cell is packaged under vacuum in a rigid housing. Positive and negative electrode tabs extend from the packaging. The battery is charged to 4.2V.

EXAMPLE 9

Alternate Cathode Current Collector

An aluminum grid used for the anode current collector is a sheet of expanded aluminum metal of about 2.5 $g/m^2$, available (Exmet, Naugatuck, Conn.).

The surface of the aluminum grid is prepared as in Example 1, substituting POLAQUA™ for the dispersed colloidal adhesion promoter. Alternatively, PAA (polyacrylic acid) can be used as an adhesion promoter.

EXAMPLE 10

Cathode Structure

A polymer/cathode mixture is prepared by mixing 10 parts KYNAR™ Flex 2801, 65 parts by weight 025C ($Li_xMn_2O_4$) (Kerr-McGee), and 5 parts of SUPER-P™ carbon black. The material is mixed for 24 hours in a ball milling jar.

To the dry, powdery cathode active mix is added 20 parts of dibutyl phthalate (DBP), and the cathode material is processed as described in Example 2, substituting the cathodic current collector of Example 9 for that of Example 1.

EXAMPLE 11

Anode Current Collector

A copper grid used for the anode current collector is a sheet of expanded copper metal about 50 $\mu$m thick. It is available under the designation 2Cu5-155 (flattened and annealed) (Delker, Branford, Conn.).

The surface of the copper grid is prepared as in Example 3, substituting POLAQUA™ for the dispersed colloidal adhesion promoter. Alternatively, PAA (polyacrylic acid) can be used as an adhesion promoter.

EXAMPLE 12

Anode Structure

An anode is prepared as described in Example 4, with substitutions. The anodic material used is 12 parts KYNAR™ Flex 2801 and 68.12 parts of $KX_{-44}$™ graphite. The anodic current collector is prepared according to Example 11. The final total thickness, including the anode film and the current collector grid, is approximately 60 to 180 $\mu$m.

EXAMPLE 13

Preparation of Improved Bi-Cell Battery

A solid electrochemical cell precursor is formed by laminating a first anode of Example 12 between two layers of separator film of Example 5. Similarly, a second anode of Example 12 is laminated between two layers of separator film of Example 5. A cathode of Example 10 is positioned between the two anode structures, and the unit is laminated together.

The layers are positioned to be, sequentially: a first separator, the first anode (copper grid current collector and a layer of anodic material), a second separator, the cathode (a layer of cathodic material, the aluminum cathode current collector, and a second layer of cathodic material), a third separator, the second anode (a layer of anodic material and a copper grid current collector), and a fourth separator. The layers are heated under pressure to form a bi-cell precursor.

Each bi-cell includes a separator membrane as the outermost surface. The wt:wt ratio of cathode to anode in the completed bi-cell is 2.68:1.

Bi-cell units are stacked, electrically interconnected, and laminated together. Plasticizer is extracted from the battery precursor, as described above in Example 7. The electrolytic cell is then packaged and activated as described above in Example 8.

EXAMPLE 14

Preparation of Alternate Improved Bi-Cell Battery

A solid electrochemical cell precursor is formed by laminating a first anode of Example 12 between individual layers of separator film of Example 5. Similarly, a second anode of Example 12 is laminated between layers of separator film of Example 5. A cathode of Example 10 is laminated between individual layers of separator film of Example 5. Finally, the cathode structure is positioned between two anode structures, and the unit is laminated together.

The layers are positioned to be, sequentially: a first separator, the first anode (copper grid current collector and a layer of anodic material), a second separator, a third separator, the cathode (a layer of cathodic material, the aluminum cathode current collector, and a second layer of cathodic material), a fourth separator, a fifth separator, the second anode (a layer of anodic material and a copper grid current collector), and a sixth separator. The layers are heated under pressure to form a bi-cell precursor.

Each bi-cell includes a separator membrane as the outermost surface. An additional separator is placed between individual bi-cells as they are stacked together. The wt:wt ratio of cathode to anode in the completed bi-cell is 2.65:1.

Bi-cell units are stacked, electrically interconnected, and laminated together. Plasticizer is extracted from the battery precursor, as described above in Example 7. The electrolytic cell is then activated and packaged as described above in Example 8.

EXAMPLE 15

Preparation of Alternate Improved Bi-Cell Battery

A solid electrochemical cell precursor is formed by laminating a first anode of Example 12 between individual layers of separator film of Example 5. Similarly, a second anode of Example 12 is laminated between layers of separator film of Example 5. A cathode of Example 10 is laminated between individual layers of separator film of Example 5. Finally, the cathode structure is positioned between two anode structures, and the unit is laminated together.

The layers are positioned to be, sequentially: a first separator, the first anode (copper grid current collector and a layer of anodic material), a second separator, a third separator, the cathode (a layer of cathodic material, the aluminum cathode current collector, and a second layer of cathodic material), a fourth separator, a fifth separator, the second anode (a layer of anodic material and a copper grid current collector), and a sixth separator. The layers are heated under pressure to form a bi-cell precursor.

Each bi-cell includes a separator membrane as the outermost surface. An additional separator is placed between individual bi-cells as they are stacked together. The wt:wt ratio of cathode to anode in the completed bi-cell is 2.65:1.

Bi-cell units are stacked, electrically interconnected, and laminated together. Plasticizer is extracted from the battery precursor, as described above in Example 7. The electrolytic cell is then activated and packaged as described above in Example 8.

Experimental

Abuse testing is conducted on a variety of batteries.

Each battery is four inches square and approximately 6 mm thick, including the packaging. A single positive lead and a single negative lead extend from the packaging, and are connected to test apparatus measuring the open circuit voltage of the battery.

For ⅔ crush tests, the batteries are crushed to two-thirds of their original thickness using a rounded edge. Full crush tests result in a battery which has been separated into two parts. For nail penetration tests, a 125 mm nail is hammered into the battery.

The temperature given is the maximum temperature reached by the battery under the abuse conditions noted. When an adverse reaction (such as smoke or sparks venting from the battery) is noted, a number is given as x/y in the column describing the abuse test done. The number of the puncture or the crush that caused venting is denoted as x. The number of punctures or crushes necessary to terminate the open circuit voltage ($O_{cv}$) is given as y. When N/C (No Change) is denoted, the battery did not vent, and the $O_{cv}$ was not terminated under the abuse test conditions. The notes section tells what specific adverse reaction was observed.

EXAMPLE 16

Experimental

Batteries are prepared according to Example 8 (Control/Prior Art). Results are as shown in Tables 1 and 2.

TABLE 1

Control Battery, Crush Abuse

| Cell No. | Temp | ⅔ Crush | Z(hp) | $R_S/R_{CT}$ | $O_{CV}$ | Notes |
|---|---|---|---|---|---|---|
| 103174 | 364° C. | 1/1 | 30.7 | 70/9 | 4.15 | Vented heavy smoke, no sparks<br>⅔ Crush caused battery failure |
| 103176 | 396° C. | 1/1 | 40.6 | 73/11 | 4.13 | Vented heavy smoke, light sparks<br>⅔ Crush caused battery failure |

TABLE 2

Control Battery, Penetration Abuse

| Cell No. | Temp | Nail Penetration | Z(hp) | $R_S/R_{CT}$ | $O_{CV}$ | Notes |
|---|---|---|---|---|---|---|
| 103177 | 416° C. | 3/3 | 32.8 | 87/7 | 4.13 | Vented heavy smoke, moderate sparks |
| 103175 | 375° C. | 4/4 | 51.0 | 70/4 | 4.13 | Vented heavy smoke, heavy sparks |

The batteries of Example 8 (the control batteries) showed unacceptable temperature elevation, smoke and sparks, and electrical characteristics upon abuse testing. The batteries were destroyed at the first ⅔ crush testing, thus full crush testing was not possible.

EXAMPLE 17

Experimental

Batteries are prepared according to Example 13. The batteries are subjected to crush abuse testing. Results are as shown in Table 3.

TABLE 3

Crush Abuse Testing

| Cell No. | Temp | ⅔ Crush | Full Crush | Z(hp) | $R_S/R_{CT}$ | $O_{CV}$ | Notes |
|---|---|---|---|---|---|---|---|
| 103536 | 47° C. | N/C | 0/3 | 27.8 | 40/5 | 4.16 | Battery viable after ⅔ crush<br>No smoke or sparks with crush |
| 103537 | 45° C. | N/C | 0/4 | 19.9 | 40/4 | 4.15 | Battery viable after ⅔ crush<br>No smoke or sparks with crush |
| 103538 | 46° C. | N/C | 0/3 | 15.6 | 36/6 | 4.16 | Battery viable after ⅔ crush<br>No smoke or sparks with crush |

The batteries of Example 13 showed some temperature elevation, but no smoke or sparks upon crushing. Electrical characteristics of the battery upon abuse testing are significantly improved over the controls. The batteries were not destroyed at the first ⅔ crush testing, and crushing continued through the full crush test on each battery.

EXAMPLE 18

Experimental

Batteries are prepared according to Example 14. The batteries are subjected to crush abuse testing and nail penetration testing. Results are as shown in Tables 4 and 5.

TABLE 4

Crush Abuse Testing

| Cell No. | Temp | ⅔ Crush | Full Crush | Z(hp) | $R_S/R_{CT}$ | $O_{CV}$ | Notes |
|---|---|---|---|---|---|---|---|
| 103563 | 38° C. | N/C | 2/4 | 21.1 | 60/5 | 4.16 | Battery viable after ⅔ crush<br>Light smoke, no sparks with crush |
| 103565 | 38° C. | N/C | 0/4 | 27.6 | 42/4 | 4.16 | Battery viable after ⅔ crush<br>No smoke or sparks with crush |
| 103567 | 47° C. | N/C | 0/0 | 31.0 | 54/4 | 4.16 | Battery viable after full crush<br>No smoke or sparks with crush |

TABLE 5

Penetration Abuse

| Cell No. | Temp | Nail Penetration | Z(hp) | $R_S/R_{CT}$ | $O_{CV}$ | Notes |
|---|---|---|---|---|---|---|
| 103560 | 35° C. | 0/0 | 22.7 | 53/3 | 4.16 | Battery viable after nail penetration tests |

The batteries of Example 14 showed some temperature elevation and some smoke (but no sparks) upon crushing. Electrical characteristics of the battery upon abuse testing are significantly improved over the controls. The batteries were not destroyed at the first ⅔ crush testing, and crushing continued through the full crush test on each battery.

Penetration abuse tests showed only a minor temperature increase, and no smoke or sparks. The electrical characteristics of the battery are significantly improved over those of the control batteries.

EXAMPLE 19

Experimental

Batteries are prepared according to Example 15. The batteries are subjected to crush abuse testing and nail penetration testing. Results are as shown in Tables 6 and 7.

TABLE 6

Crush Abuse Testing

| Cell No. | Temp | ⅔ Crush | Full Crush | Z(hp) | $R_S/R_{CT}$ | $O_{CV}$ | Notes |
|---|---|---|---|---|---|---|---|
| 103573 | 134° C. | N/C | ⅓ | 27.4 | — | 4.15 | Battery viable after ⅔ crush<br>No smoke or sparks ⅔ crush<br>Moderate smoke, no sparks on full crush |

TABLE 7

Penetration Abuse Testing

| Cell No. | Temp | Nail Penetration | Z(hp) | $R_S/R_{CT}$ | $O_{CV}$ | Notes |
|---|---|---|---|---|---|---|
| 103569 | 33° C. | 0/0 | 29.1 | — | 4.16 | Battery viable after nail penetration tests |
| 103674 | 38° C. | 0/0 | 16.3 | — | 4.16 | Battery viable after nail penetration tests |

The batteries of Example 15 showed significant temperature elevation and some smoke (but no sparks) upon full crushing. Electrical characteristics of the battery upon abuse testing are significantly improved over the controls.

Penetration abuse tests showed only a minor temperature increase, and no smoke or sparks. The batteries were still viable after nail penetration. The electrical characteristics of the battery are significantly improved over those of the control batteries.

All percentages are weight/weight percent, unless noted otherwise. When a range of values is given to be "about" a certain percentage, each of the upper and lower ranges can be varied by 5 to 10 percent if such variation does not cause detrimental function to the system.

While the invention has been described in connection with several exemplary embodiments, it will be understood that many modifications will be apparent to those of ordinary skill in the art in light of the above disclosure. Reference to the following claims should be made to determine the scope of the claimed invention.

We claim:

1. An improved structure for multiple lithium polymer bi-cell batteries, wherein each bi-cell comprises, sequentially, (i) a first anode;
(ii) a first separator element;
(iii) a cathode;
(iv) a second separator element; and
(v) a second anode;

wherein said improved structure comprises a first bi-cell and a second bi-cell separated by an insulator element, further comprising a battery housing which encloses multiple bi-cells; and an electrolyte solvent contained within said battery housing and permeating said enclosed bi-cells.

2. A bi-cell battery structure of claim 1 wherein at least three bi-cells are present, and an insulator element is positioned between adjacent bi-cells.

3. A bi-cell battery structure of claim 1 wherein said insulator element is impermeable to said electrolyte solvent.

4. A bi-cell battery structure of claim 3 wherein said insulator element is selected from the group consisting of a solid sheet of mylar, a solid sheet of polyester, and a solid sheet of silicon.

5. A bi-cell battery structure of claim 1 wherein said insulator element is permeable to said electrolyte solvent.

6. A bi-cell battery structure of claim 5 wherein said insulator element is selected from the group consisting of a perforated sheet of mylar, a perforated sheet of polyester, and a perforated sheet of silicon.

7. A bi-cell battery structure of claim 5 wherein said insulator element is a porous separator material.

8. A bi-cell battery structure of claim 5 wherein said insulator element is a PVdF:HFP copolymer.

* * * * *